United States Patent Office.

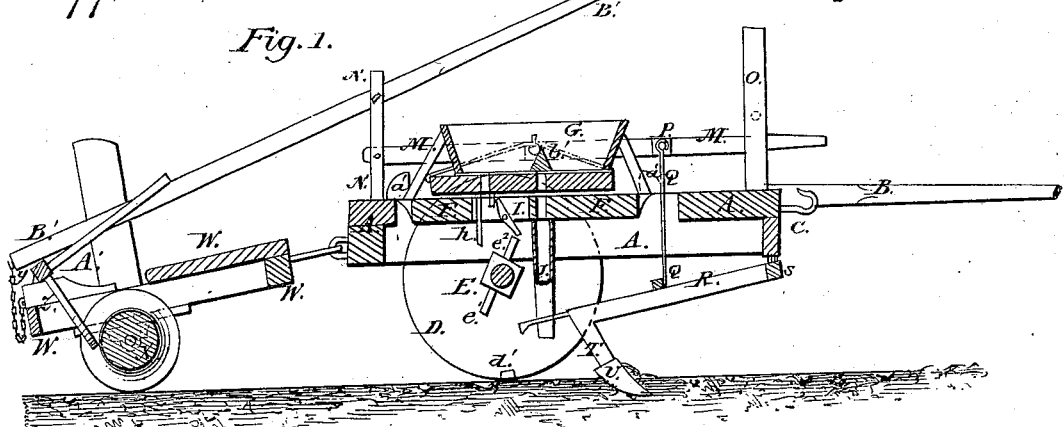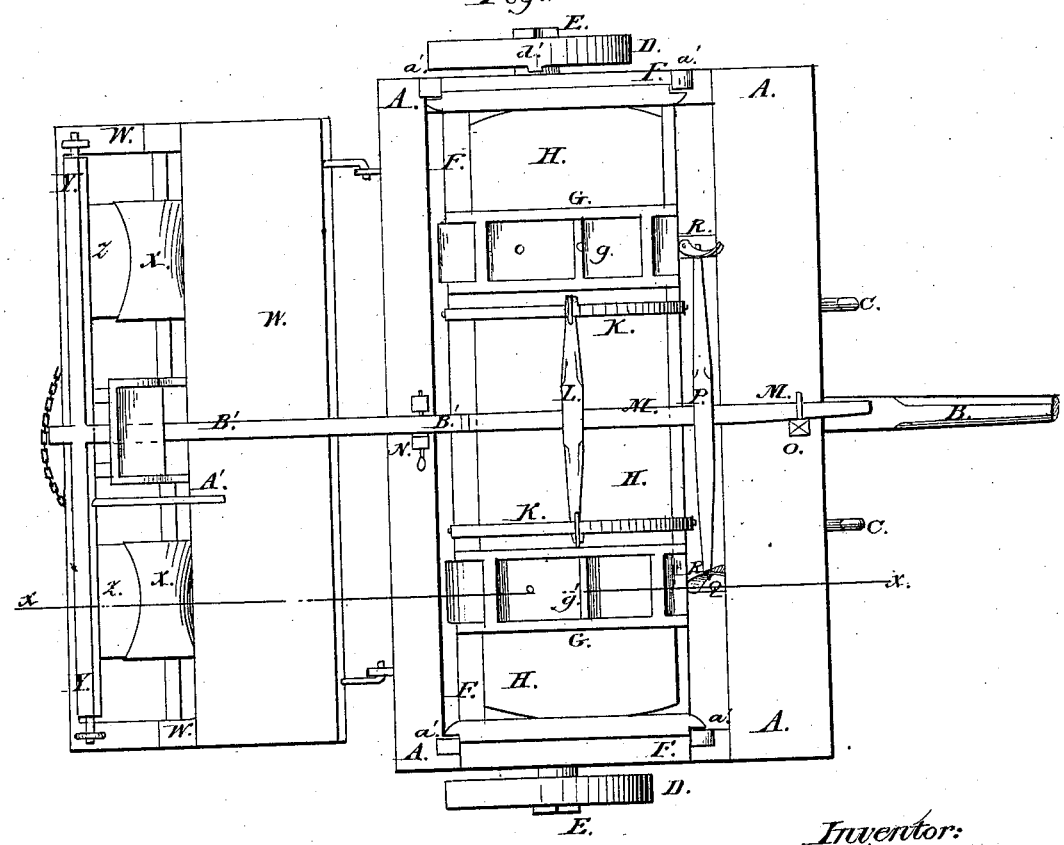

D. A. KERSHNER, OF ELLIOTTSTOWN, ILLINOIS.

Letters Patent No. 77,050, dated April 21, 1868.

IMPROVEMENT IN CORN-PLANTER.

*The Schedule referred to in these Letters Patent and making part of the same.*

TO ALL WHOM IT MAY CONCERN:

Be it known that I, D. A. KERSHNER, of Elliottstown, in the county of Effingham, and State of Illinois, have invented a new and improved Corn-Planter; and I do hereby declare that the following is a full, clear, and exact description thereof, which will enable those skilled in the art to make and use the same, reference being had to the accompanying drawings, forming part of this specification, in which—

Figure 1 is a detail sectional view of my improved corn-planter, taken through the line $x\,x$, fig. 2.

Figure 2 is a top or plan view of the same.

Similar letters of reference indicate corresponding parts.

My invention has for its object to furnish an improved corn-planter, which shall be so constructed and arranged as to drop the corn, cover it, and mark the place in which the corn is planted, so that the corn may be conveniently planted in check-row; and it consists in the construction and combination of the various parts, as hereinafter more fully described.

A is the frame of the machine, to which the other parts of the machine are attached.

B is the tongue, and C are the draught-hooks, to which the whiffle-trees are attached.

D are the wheels, which should be made of such a size that one revolution of said wheels may measure off twice the space that the hills are desired to be apart, and one or both of which wheels should have projections $d'$ formed upon them, to mark the line of the hills.

One of the wheels D should revolve loosely upon the axle E, and the other should be rigidly attached to said axle, so as to carry it with it in its revolution.

The axle E revolves in bearings attached to the under side of the frame A.

F is the bed-plate of the dropping-device, which rests upon the frame, A, of the machine, between four short guide-posts, $a'$, attached to the said frame, so that the said bed-plate can only move up and down vertically.

G are the hoppers, which are securely attached to the bed-plate F.

H is the dropping-plate, which is placed upon the upper side of the bed-plate, and extends through and forms the bottom of both hoppers G.

The dropping-plate H has two holes formed through it within each hopper, through which the corn passes to the hole, through the bed-plate F, as the said holes are moved alternately over the hole in the bed-plate.

$g'$ is a small triangular bar, secured in the lower parts of the hoppers in such a position as to be directly over the hole in the bed-plate F, and thus prevent the corn from passing into the holes of the dropping-plate when they are over the hole in the bed-plate, so that only the desired amount of corn may pass out at a time.

$h'$ is a short arm attached to the dropping-plate H, and projecting down through an opening in the bed-plate F, so that it may be struck by the short arm, $e'$, attached to the axle E, to move the said dropping-plate forward.

I is a short lever, pivoted to the bed-plate F in such a position that when its lower end is struck by the arm $e^2$, attached to and projecting from the side of the axle E, opposite to the arm $e^1$, its upper end may operate upon the dropping-plate H, to move it back, thus bringing the holes in said dropping-plate alternately over the hole in the bed-plate F.

J are conducting-spouts, made of leather, and attached to the lower side of the bed-plate F, to receive the corn and conduct it to the ground.

K are leather straps, the ends of which are attached to the front and rear sides of the bed-plate F, and the middle parts of which pass through keepers attached to the ends of the cross-bar L.

The middle part of the cross-bar L is attached to the lever M, the rear end of which is pivoted to the slotted standard N, attached to the rear part of the frame A, and its forward end extends forward so as to pass beyond the standard O, so that, by raising the forward end of the lever M, the dropping-device will be raised from the axle E.

P is a cross-bar attached to the lever M, to the ends of which are adjustably attached the ends of the leather straps Q, the lower ends of which are attached to the plough-beams R, so that, as the dropping-device is raised from the axle E, by operating the lever M at the same time, and by the same operation, the ploughs may be raised from the ground.

The forward ends of the plough-beams R are attached to the bars S, the ends of which work in bearings attached to the under side of the frame A, and to their rear ends are attached the upper ends of the standards T, to the lower ends of which the ploughs U are secured.

To the rear ends of the plough-beams R are attached rings V, through which the leather spouts J pass, so as to keep the said spouts always in position to conduct the corn to the bottom of the furrow made by the ploughs U.

W is the roller-frame, the forward side of which is hinged to the rear side of the frame A by hooks and eye-bolts, or by other convenient means.

X are rollers, the journals of which revolve in bearings attached to the frame W.

The faces of the rollers X are hollowed out or concaved, and they are placed directly in the rear of the ploughs and dropping-spouts, so that, as the said rollers are drawn forward, they may press the sides of the furrows inward and cover the corn, at the same time that they smooth off the surface of the ground.

Y is a shaft, the ends of which revolve in bearings attached to the upper side of the rear part of the frame W, and to the lower side of which are attached the scraper-plates Z, the lower ends of which are made of such a shape as to fit the concave surface of the rollers X.

A' is a lever, the rear end of which is attached to the shaft Y, and the forward end of which extends forward into such a position as to be readily reached and operated by the driver, from his seat, whenever it is desired to clean the rollers X.

B' is a long lever, the rear end of which is connected with the rear side of the roller-frame W by short chains.

The lever B' is pivoted to the slotted standard N, and its forward end extends forwards, so that, by depressing the said forward end, and securing it by a pin placed above it in the standard O, the roller-frame and its attachments may be raised and held suspended.

I claim as new, and desire to secure by Letters Patent—

1. The combination of the bed-plate F, sliding dropping-plate H, hoppers G, leather conducting-spouts J, projection $h'$, pivoted lever I, and arms $e^1$ $e^2$, with each other and with the axle E and frame A, substantially as herein shown and described, and for the purpose set forth.

2. The combination of the lever M, cross-bars L and P, and leather straps K and Q, with each other and with the bed-plate F and plough-beams R, substantially as herein shown and described, and for the purpose set forth.

3. The combination of the frame W, concave rollers X, scraping-device Y Z A', and lever B', with each other and with the frame A, substantially as herein shown and described, and for the purpose set forth.

The above specification of my invention signed by me, this 31st day of January, 1868.

D. A. KERSHNER.

Witnesses:
GEORGE W. SLOAN,
L. J. FIELDS.